United States Patent [19]
Lin et al.

[11] Patent Number: 5,365,531
[45] Date of Patent: Nov. 15, 1994

[54] APPARATUS AND METHOD FOR INITIALIZING AN OPTICAL-FIBER LASER FOR MODE LOCKING

[75] Inventors: Hong Lin, Palo Alto; Wayne V. Sorin, Mountain View; David K. Donald, Monte Sereno, all of Calif.

[73] Assignee: Hewlett-Packard Company, Palo Alto, Calif.

[21] Appl. No.: 980,896

[22] Filed: Nov. 24, 1992

[51] Int. Cl.$^5$ .............................. H01S 3/098
[52] U.S. Cl. .......................... 372/18; 372/6; 372/94
[58] Field of Search .................. 372/6, 18, 93, 94

[56] References Cited

U.S. PATENT DOCUMENTS

| 4,323,310 | 4/1982 | Shaw et al. | 356/350 |
| 5,050,183 | 9/1991 | Duling, III | 372/94 |

OTHER PUBLICATIONS

Irl N. Duling III, "All-Fiber ring solition laser mode locked with a nonlinear mirror", Optics Letters, vol. 16, No. 8, Apr. 15, 1991, pp. 539–541.

Masataka Nakazawa et al., "Low threshold, 290 fs erbium–doped fiber laser with a nonlinear amplifying loop mirror pumped by InGaAsP laser diodes", Appl. Phys. Lett. 59, Oct. 21, 1991, pp. 2073–2075.

D. J. Richardson et al., "Selfstarting, Passively Mode-locked Erbium Fibre Ring Laser based on the Amplifying Sagnac Switch", Electronics Letters, vol. 27, No. 6, Mar. 14, 1991, pp. 542–543.

Primary Examiner—Frank Gonzalez
Attorney, Agent, or Firm—Pamela L. Kee

[57] ABSTRACT

A figure-8 loop laser having a controllable phase shifter in a Sagnac loop (non-linear amplifying loop mirror). A half-wave plate in series with Faraday optical rotators provide a switchable non-reciprocal 180-degree phase shifter that allows the birefringence of the fiber loop to be adjusted during continuous wave operation. The phase shifter is activated during continuous wave operation to find a minimum threshold and then is turned off, placing the laser in optimum state for mode locking.

18 Claims, 2 Drawing Sheets

APPARATUS AND METHOD FOR INITIALIZING AN OPTICAL-FIBER LASER FOR MODE LOCKING

BACKGROUND OF THE INVENTION

The present invention pertains generally to laser systems and more particularly to an apparatus and method for initializing an optical-fiber for mode locking by introducing a controllable phase shift into the laser cavity.

Modern communication systems increasingly use light waves traveling through optical fibers to carry information such as telephone conversations, television signals, digital data for computers, and the like. Optical fiber systems need reliable sources of narrow light pulses at high repetition rates. These narrow optical pulses are needed not only for optical communications but also for other kinds of lightwave instruments and more generally in other fields of scientific research.

Narrow optical pulses can be generated by a mode-locked laser. A laser produces a number of optical signals over a band of frequencies. If these signals are in phase, they combine to produce a narrow pulse. The laser is said to be mode-locked when theses signals are synchronized such as to produce a series of narrow pulses at a desired repetition rate.

Semiconductor lasers have been used to generate optical pulses. Although such lasers can produce very narrow pulses at high repetition rates, they generate chirped pulses which are not transform-limited and therefore are undesirable.

The fiber optic FIG.-8 laser (referred to herein as "F8L") shows great promise as a source of narrow short optical pulses. Existing F8Ls can generate pulses having widths of hundreds of femtoseconds and repetition rates of a few gigahertz. These pulses are better than those produced by semiconductor lasers in that they are transform-limited and have a hyperbolic secant squared ("$sech^2$") shaped enveloped in the time domain. Some applications for which the F8L is potentially well-suited include: a source for soliton transmissions, building compact electro-optic sampling systems, testing soliton transmission systems, and a lightwave source for time domain testing of high-speed lightwave systems. Unfortunately, this promising technology encounters some major obstacles.

One major stumbling block is the initiation of mode-locking. A F8L is structured in two loops, one of which, referred to as a Sagnac loop, includes an amplifying medium such as an erbium-doped fiber. An optical pump is used to activate the laser. Theoretically, the only limits to the repetition rate of the short optical pulses generated within the F8L are believed to be those of pulse energy and power extraction from the amplifying medium. However, in real fiber optics systems, birefringence, the phenomenon of light waves having different polarizations travelling at different velocities through a medium, makes it difficult to start and control the mode-locking in the laser.

Attempts have been made to control the effects of birefringence by optimizing the polarization in the F8L. Accordingly, one method of optimization is placing polarization controllers in the F8L. This method is hit or miss and is often too slow. A proposed method is fabricating the Sagnac loop from polarization-preserving fiber. However, erbium doped fiber amplifiers are not available in polarization-preserving form. Thus, no systematic solution to the birefringence problem has been found.

Even in F8Ls using polarization preserving schemes, mode-locking cannot be started consistently. Thus, the desired operating mode is difficult to initialize. Attempts to start the system using excessively strong pumping or mechanical perturbations of the system itself have been unreliable. When mode-locking does occur, the pulses often bunch around a fundamental repetition rate and are not equally paced apart. Further, if mode-locking is successfully initiated, the continued generation of short optical pulses is not guaranteed. Accordingly, it can be seen that the development of a F8L that is easy to start and that reliably produces narrow periodic pulses at a desired repetition rate continues to pose a difficult challenge.

The repetition rates of F8Ls are usually low, in the range of several MHz. For many applications, such as trans-oceanic soliton transmission and high speed electro-optics sampling, it is essential that the F8L produce increased round-trip repetition rates. Attempting to increase the repetition rate by increasing the pumping intensity results in sporadic and uncontrollable pulses.

One method of increasing the round-trip repetition rate is to employ a Fabry-Perot etalon, an interferometer with fixed mirror separation. The Fabry-Perot etalon is placed into the F8L to control the repetition rate through constructive interference. The number of pulses in a given period is always an integer multiple of the number of completed waves during that period. Although use of the Fabry-Perot etalon provides an adequate repetition rate, it makes starting the laser more difficult.

Much of the current research in F8Ls is focused on one or more of the aforementioned problems. As yet, little attention has been paid to another serious problem: timing jitter. Ideally, the output pulses should be evenly spaced in the time domain. Without active stabilization, the output pulses are prone to timing jitter and cannot be locked to a reference signal.

From the foregoing, it will be apparent that there is a great need for a F8L that can be reliably started and is capable of generating short optical pulses at a controllable, high repetition rate, with a minimum of timing jitter.

SUMMARY

The present invention provides an easy-to-start FIG.-8 laser ("F8L") and a method of initializing such a laser for mode-locking so as to generate very short optical pulses at high repetition rates. The repetition rate is easily controlled and the pulses have negligible timing jitter. This new laser opens the door to new advances in such fields as high speed electro-optic sampling, trans-oceanic telecommunications, and scientific research.

Briefly and in general terms, a F8L according to the invention includes a single-mode fiber loop and a Sagnac loop optically coupled together. The fiber loop includes an optical isolator, a polarization controller, and an output coupler. The Sagnac loop includes another polarization controller, an amplifying medium such as an erbium-doped fiber, an input pump coupler, and a controllable phase shifter.

In one embodiment, of the invention, a non-reciprocal phase shifter ("NRPS"), preferably in combination with a piezo-electric ("PZT") phase shifter, serves as the controllable phase shifter. A set of Faraday optical rotators may be used as the NRPS. The NRPS has two states: a reciprocal state and a non-reciprocal state. The NRPS is set to one of these states during continuous wave operation to permit rapid and dependable adjustment of the birefringence of the loop so as to optimize the laser and then is switched to the other state for mode-locking.

In another embodiment, a time varying phase modulator is used as the controllable phase shifter. This provides a means of both starting and controlling optical pulses. The modulator may be modulated by an optical signal or by a microwave or other electrical signal.

A more complete understanding and appreciation of the aims and objectives of the present invention may be achieved by referencing the following description of the preferred embodiment and the accompanying drawings.

DETAILED DESCRIPTION OF THE PREFERRED EMBODIMENT

Figure 1:
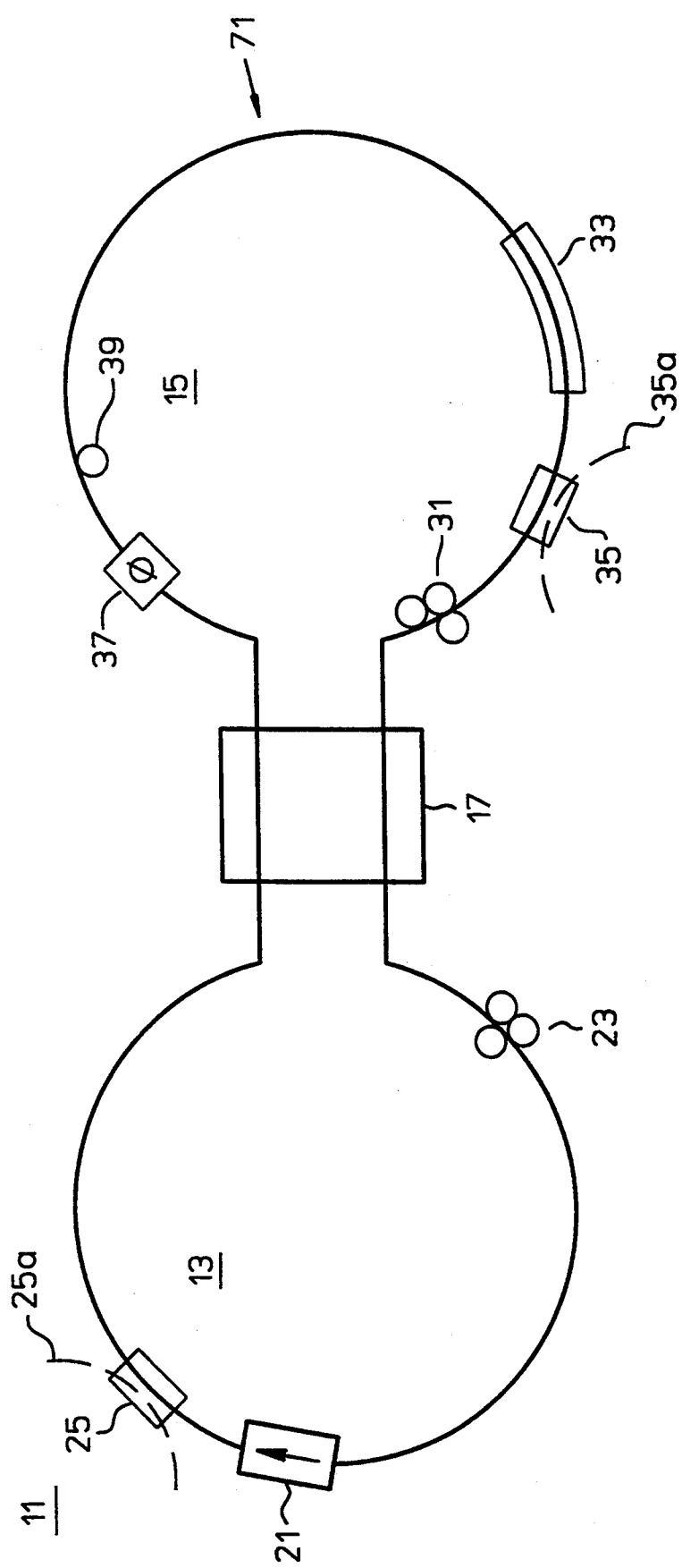
FIG. 1 shows a fiber loop laser having a controllable phase shifter in the Sagnac loop according to a first embodiment of the invention.

As shown in the drawings for purposes of illustration, the invention is embodied in a novel FIG.-8 laser ("F8L") which includes a controllable phase shifter. There has been a need for a laser that can generate short optical pulses and that is not subject to such adverse effects as excessive timing jitter, frequency chirping, low repetition rate, and difficulty in starting.

In accordance with the invention, a controllable phase shifter such as a non-reciprocal phase shifter or a time-varying phase modulator is inserted in a Sagnac loop of a F8L. The resulting laser is easily started and can provide very short optical pulses at high repetition rates without significant timing jitter or frequency chirping.

As shown in FIG. 1, a F8L generally 11, according to the invention, includes a single mode fiber loop 13 and a Sagnac loop 15 which are joined by an optical coupler 17. The fiber loop 13 has an optical isolator 21, a first polarization controller 23, and an output coupler 25, by which an amplified light signal 25A is extracted, connected in series. The Sagnac loop 15 is formed from a second polarization controller 31, an amplifying medium such as an erbium-doped fiber 33 used to amplify an optical signal, an input pumping coupler 35, which receives pumping energy 35A, and a controllable phase shifter 37 in a serial connection.

It will be apparent that FIG. 1 is not drawn to scale. For example, the Sagnac loop 15 may include enough optical fiber to provide an optical path about 100 meters long. This fiber could be arranged in a single large loop but the usual practice would be to coil it up for convenience.

Conceptually, the operation of a conventional F8L is as follows. An optical pulse propagates through the two loops 13 and 15. As it propagates, the pulse is shortened and amplified by each transmission through the Sagnac loop 15. The Sagnac loop operates as a non-linear amplifying loop mirror. High intensity portions of the pulse are amplified and transmitted, while low-intensity portions are reflected and rejected by the optical isolator 21. The isolator 21 provides the mechanism to eliminate the unwanted reflected light from the Sagnac loop 15. In passive modulation, the laser 11 can produce pulses at any repetition rate having a period that is an integer multiple of the roundtrip time of a pulse through both loops. The F8L only functions in this manner when the polarization controllers 23 and 31 have been optimized.

The above-described components used to make a F8L are commercially available. The optical isolator may be purchased from Hewlett-Packard Company, the assignee of the invention disclosed herein, part number HP81310. All of the optical fiber used in the apparatus is available from Corning Glass, Inc. The erbium doped fiber 33 which is used for the amplifying medium is available from AT&T. The optical coupler 35 is a pump coupler such as a wavelength division multiplier. Such optical couplers are available from Amphenol Corporation in its 945 series.

The operation of the F8L and the contribution of the principles of the invention will now be broadly described. A conventional F8L in a continuous wave ("CW") operation provides a steady sinusoidal output signal. In mode-locking operation, the output of the laser resembles a sequence of impulses. Mode-locking cannot be initiated until the fiber birefringence has been adjusted by means of the polarization controllers to minimize power loss and thereby optimize the performance of the laser. Accordingly, the laser is first placed in CW operation, adjusted for optimum performance, and then placed into mode-locking operation.

A non-reciprocal phase shift occurs naturally in the fiber during mode-locking operation of the laser. The present invention arises from the discovery that artificially creating this phase shift during CW operation makes it easy to adjust the birefringence of the laser. Accordingly, the principles of the invention are employed to mimic, during CW operation, the non-reciprocal phase shift that occurs naturally during mode-locking operation to facilitate the optimization of the laser.

In a first preferred embodiment of the invention, the controllable phase shifter 37 comprises a non-reciprocal phase shifter ("NRPS"). In addition, a piezo-electric ("PZT") phase shifter 39 is inserted into the Sagnac loop 15 in series with the NRPS.

Figure 2:
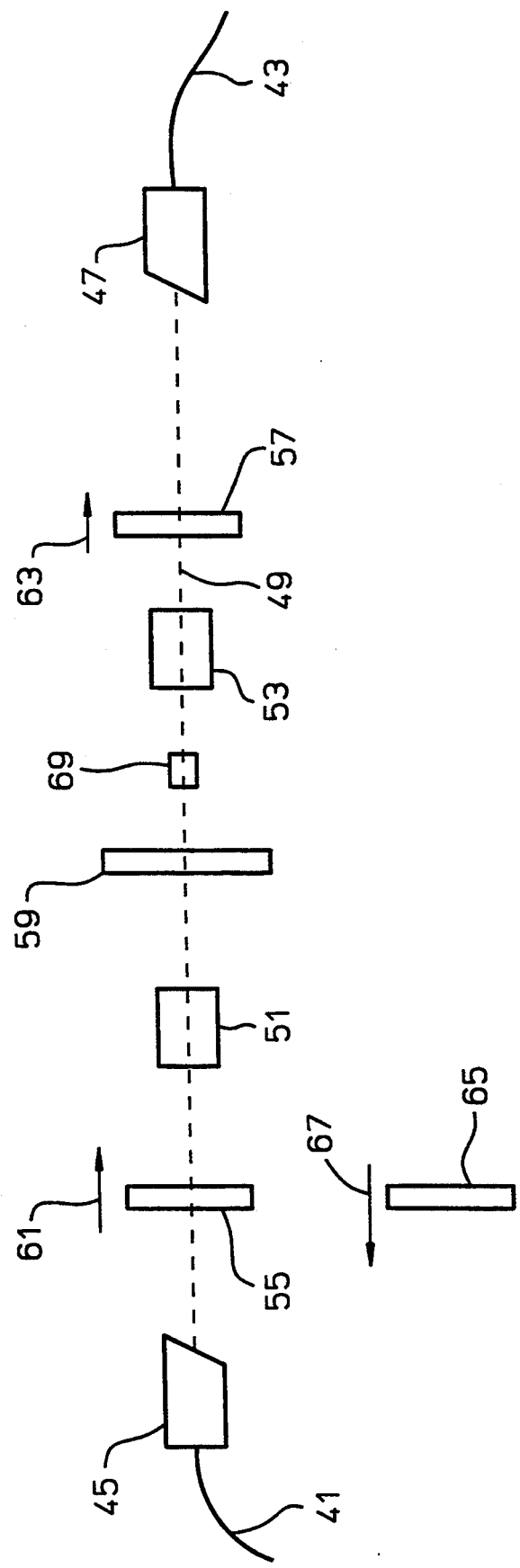
FIG. 2 shows an example of a non-reciprocal phase shifter of the kind used as the controllable phase shifter in the first preferred embodiment of the invention.

A switchable NRPS is shown in FIG. 2. The NRPS is optically coupled to the rest of the system through optical fibers 41 and 43. An angle-polished end 45 of the fiber 41 and the angle-polished end 47 of the fiber 43 are located such that a beam of light emerging from one of them is directed toward the other along an optical axis 49. A micro-positioner (not shown) may be used to adjust the fiber ends 47 and 49 as necessary.

A pair of graded index ("GRIN") lenses 51 and 53 are located along the optical axis 49, for example in a suitable holder (not shown) such that the GRIN lens 51 receives light emanating from the fiber end 45 and the GRIN lens 53 receives light emanating from the fiber end 47. A 45° Faraday rotator 55 is disposed between the GRIN lens 51 and the fiber end 45, and a second 45° Faraday rotator 57 is disposed between the GRIN lens 53 and the fiber end 47. A rotatable half-wave plate 59 is situated between the GRIN lenses 51 and 53.

The Faraday rotators 55 and 57 are placed in magnetic fields that are oriented in the same direction relative to each other, as indicated by arrows 61 and 63, respectively. A third 45° Faraday rotator 65 is placed in a magnetic field that is oriented oppositely to the other magnetic fields as indicated by an arrow 67. The magnetic fields are provided by permanent magnets or the like (not shown).

The NRPS has two states: reciprocal and non-reciprocal. With the Faraday rotators 55 and 57 on the optical axis 49 as shown, such that the magnetic fields of the two Faraday rotators that are on the optical axis 49 are oriented in the same direction, the NRPS is in the reciprocal state. Moving the Faraday rotator 55 off of the optical axis 49 and moving the Faraday rotator 65 onto the optical axis 49, such that the magnetic fields of the two Faraday rotators that are on the optical axis 49 are oppositely-directed, places the NRPS in the non-reciprocal state.

The Faraday rotators 55, 57, and 65 are commercially available from Mitsubishi. The GRIN lenses 51 and 53 are available from Nippon Electric. The half-wave plate 59 is available from Newport, Inc. A source for the optical fibers 41 and 43 is Corning Glass, Inc.

The NRPS is used to optimize birefringence. Although the NRPS may be positioned anywhere in the Sagnac loop 15, due to its lossy nature the NRPS is most effective generally opposite the erbium doped amplifier 33, as shown in FIG. 1. Adjusting for birefringence of the F8L may be done when the NRPS is in either state. However, it is usually much easier to start the mode-locking when the NRPS is in the non-reciprocal state due to the inherent noise in the system. Thus, the NRPS is preferably placed in the reciprocal state when it is desired to adjust the birefringence of the laser during CW operation.

The birefringence is easily adjusted using the NRPS. The two states are separated by a differential phase shift of approximately 180°. Initially, the NRPS is used in the reciprocal state, which provides a 0° differential phase shift, during CW operation. The laser is then adjusted for the minimum continuous wave threshold. Switching the NRPS to its non-reciprocal state to provide a 180° differential phase shift places the laser in condition for mode-locking.

When the NRPS is switched to the non-reciprocal state, mode-locking is initiated, for example by activating the PZT phase shifter 39. An optional bandpass filter 61 may be added to the NRPS to limit the frequency range of the laser. This filter 67 is shown as being located between the half-wave plate 59 and the GRIN lens 53, but it may be placed anywhere within the NRPS.

Other methods of switching between the states of the NRPS will suggest themselves to those knowledgeable in the art including applying a current controlled magnetic field. This would make the mechanical switching of the Faraday rotators unnecessary.

In a second preferred embodiment of the invention, a time varying phase modulator may be used as the controllable phase shifter 37. In this embodiment, the phase modulator actively mode locks the laser. Furthermore, the resulting repetition rate can be controlled by driving the phase modulator at a harmonic of a frequency defined by the round-trip repetition rate. The phase modulator may be driven by an optical signal generator or an electrical signal generator. After the pulses in the cavity build up in intensity, the amplitude of the phase shift can be gradually reduced. The phase modulator may be driven with a pulse generator at the desired frequency.

Phase modulators of lithium niobate (LiNbO$_3$) are available from British Telecom and from Dupont.

The birefringence of the Sagnac loop 15 may be adjusted by driving the phase modulator with a square wave. The square wave produces a non-reciprocal-phase shift of 180° during CW wave operation. By adjusting the laser to the minimum CW threshold, the optimum state of fiber birefringence for mode-locking is ensured.

The introduction of the differential phase shift into the system by either a phase modulator or a non-reciprocal phase shifter allows for easy initialization of the F8L. By introducing a non-reciprocal phase shift into the laser, CW lasing can occur and the polarization controllers may be adjusted to account for the birefringence effect.

Any timing jitter of the output can be easily controlled by driving the modulator to force the laser to lock onto a reference signal. The phase modulator is driven by a precisely timed electrical signal and the phase modulator synchronizes the mode locking with that signal. The use of the electrical signal serves two purposes: the timing of the pulses is controlled and timing jitter is reduced.

From the foregoing, it will be appreciated that the present invention provides a method and apparatus for initializing an optical-fiber laser system for mode locking by introducing a controllable phase shift into the laser cavity. A laser system that embodies the principles of the invention is easily and reliably started and is capable of generating short optical pulses at a controllable, high repetition rate, with a minimum of timing jitter.

It will be apparent that different working embodiments in a wide range can be formed without deviating from the spirit and scope of the present invention. Therefore, the present invention is not restricted by the specific embodiments described and illustrated herein except as being limited in the appended claims.

What is claimed is:

1. A fiber loop laser comprising:
   a fiber loop having an output coupler;
   a Sagnac loop, optically coupled to the fiber loop to define an optical path, having an input coupler receiving excitation energy;
   wherein the optical path includes the fiber loop and the Sagnac loop;
   polarization compensation means in the optical path;
   an amplifying medium in the optical path, operative to amplify a light signal in the optical path sufficiently to cause to the laser to oscillate;
   wherein the output coupler extracts a portion of the amplified light signal; and
   a controllable phase shifter in the optical path, operative to introduce a non-reciprocal phase shift before mode-lock to initialize the laser for mode-locking.

2. A laser as in claim 1 wherein the controllable phase shifter comprises a non-reciprocal phase shifter.

3. A laser as in claims 2 wherein the non-reciprocal phase shifter comprises a plurality of Faraday optical rotators.

4. A laser as in claim 2 and further comprising a piezo-electric phase shifter in series with the non-reciprocal phase shifter.

5. A laser as in claim 1 wherein the controllable phase shifter comprises a phase modulator.

6. A laser as in claim 5 and further comprising modulating means to modulate the phase modulator over time.

7. A laser as in claim 6 wherein the modulating means comprises an optical signal generator.

8. A laser as in claim 6 wherein the modulating means comprises an electrical signal generator.

9. A fiber loop laser comprising:
   a single mode fiber loop including an optical isolator, a first polarization controller, and an output coupler in a series connection;
   a Sagnac loop including a second polarization controller, an amplifying medium operative to amplify an optical signal, an input coupler which receives excitation energy from an external source, and a controllable phase shifter in a series connection; and
   optical coupling means coupling the fiber loop and the Sagnac loop together.

10. A fiber loop laser as in claim 9, wherein the controllable phase shifter comprises a non-reciprocal phase shifter.

11. A fiber loop laser as in claim 10, wherein the non-reciprocal phase shifter comprises a plurality of Faraday optical rotators.

12. A fiber loop laser as in claim 10, and further comprising a piezo-electric phase shifter in the Sagnac loop with the non-reciprocal phase shifter.

13. A fiber loop laser as in claim 9, wherein the controllable phase shifter comprises a phase modulator.

14. A fiber loop laser as in claim 13, further comprising modulating means to modulate the phase modulator in time.

15. The fiber loop laser as in claim 14, wherein the modulating means comprises an optical signal generator.

16. The fiber loop laser as in claim 14, wherein the modulating means comprises an electrical signal generator.

17. A method of initializing a laser for mode-locking, comprising the steps of:
   introducing a non-reciprocal phase shift into the laser;
   placing the laser in continuous wave operation;
   adjusting birefringence within the laser to optimize the laser for mode-locking;
   introducing a reciprocal phase shift into the laser; and
   initiating mode-locking.

18. A method of initializing a laser for mode-locking, comprising the steps of:
   introducing a reciprocal phase shift into the laser;
   placing the laser in continuous wave operation;
   adjusting birefringence within the laser to optimize the laser for mode-locking;
   introducing a non-reciprocal phase shift into the laser; and
   initiating mode-locking.

* * * * *